(12) United States Patent
Oztaskent

(10) Patent No.: US 10,198,236 B2
(45) Date of Patent: *Feb. 5, 2019

(54) METHODS, SYSTEMS, AND MEDIA FOR PROVIDING A REMOTE CONTROL INTERFACE

(71) Applicant: Google LLC, Mountain View, CA (US)

(72) Inventor: Ant Oztaskent, Sutton (GB)

(73) Assignee: Google LLC, Mountain View, CA (US)

( * ) Notice: Subject to any disclaimer, the term of this patent is extended or adjusted under 35 U.S.C. 154(b) by 130 days.

This patent is subject to a terminal disclaimer.

(21) Appl. No.: 15/180,834

(22) Filed: Jun. 13, 2016

(65) Prior Publication Data

US 2016/0299735 A1 Oct. 13, 2016

Related U.S. Application Data

(63) Continuation of application No. 13/800,020, filed on Mar. 13, 2013, now Pat. No. 9,367,144.

(51) Int. Cl.
*G06F 3/048* (2013.01)
*G06F 3/14* (2006.01)
(Continued)

(52) U.S. Cl.
CPC ............ *G06F 3/1454* (2013.01); *G06F 3/033* (2013.01); *G06F 3/0482* (2013.01); *G06F 3/04847* (2013.01); *G06K 9/18* (2013.01); *G08C 23/04* (2013.01); *G08C 2201/21* (2013.01); *G08C 2201/40* (2013.01); *G08C 2201/93* (2013.01)

(58) Field of Classification Search
CPC ...... G06F 3/1454; G06F 3/033; G06F 3/0482; G06F 3/04847; G08C 23/06
See application file for complete search history.

(56) References Cited

U.S. PATENT DOCUMENTS 8,392,852 B2 3/2013 Tokashiki
2006/0041655 A1* 2/2006 Holloway ................. G06F 1/18
709/223
(Continued)

FOREIGN PATENT DOCUMENTS

WO WO/2007/048823 5/2007

OTHER PUBLICATIONS

International Preliminary Report on Patentability dated Sep. 24, 2015 in International Patent Application No. PCT/US2014/025260.
(Continued)

*Primary Examiner* — Hua Lu
(74) *Attorney, Agent, or Firm* — Byrne Poh LLP

(57) ABSTRACT

In accordance with some implementations of the disclosed subject matter, mechanisms for providing a remote control interface are provided. In some implementations, a method for providing a remote control interface is provided, the method comprising: receiving an image of a user input interface associated with a media playback device; identifying the user input interface from a plurality of user input interfaces based on image recognition; determining a code library associated with the identified user input interface; and transmitting the code library to a mobile device that provided the image of the user input interface, wherein the code library allows a mobile device to control the media playback device.

18 Claims, 8 Drawing Sheets

(51) Int. Cl.
  *G06F 3/033* (2013.01)
  *G08C 23/04* (2006.01)
  *G06F 3/0482* (2013.01)
  *G06F 3/0484* (2013.01)
  *G06K 9/18* (2006.01)

(56) References Cited

U.S. PATENT DOCUMENTS

| | | | | |
|---|---|---|---|---|
| 2007/0279244 A1* | 12/2007 | Haughawout | .......... | G08C 19/28 340/4.31 |
| 2008/0003993 A1* | 1/2008 | Rye | .......... | G08C 17/00 455/418 |
| 2008/0166105 A1* | 7/2008 | Vanderhoff | .......... | G08C 23/04 386/291 |
| 2009/0285443 A1* | 11/2009 | Camp, Jr. | .......... | G08C 17/02 382/100 |
| 2010/0123613 A1* | 5/2010 | Kohanek | .......... | G08C 19/28 341/176 |
| 2010/0134318 A1* | 6/2010 | Haughawout | .......... | G08C 19/28 340/12.25 |
| 2011/0126158 A1 | 5/2011 | Fogarty et al. | | |
| 2011/0191516 A1* | 8/2011 | Xiong | .......... | G06F 13/14 710/305 |
| 2011/0304778 A1* | 12/2011 | Roberts | .......... | G08C 17/02 348/734 |
| 2012/0041925 A1* | 2/2012 | Pope | .......... | G06F 3/0486 707/626 |
| 2012/0068857 A1* | 3/2012 | Rothkopf | .......... | G08C 19/28 340/870.07 |
| 2012/0119998 A1* | 5/2012 | Sato | .......... | H04N 21/47 345/169 |
| 2012/0272148 A1 | 10/2012 | Strober | | |
| 2012/0274864 A1* | 11/2012 | King | .......... | G08C 17/02 348/734 |

OTHER PUBLICATIONS

International Search Report and Written Opinion dated Mar. 14, 2014 in International Patent Application No. PCT/US2014/025260.
Office Action dated Dec. 12, 2014 in U.S. Appl. No. 13/800,020.
Office Action dated Mar. 3, 2015 in U.S. Appl. No. 13/800,020.
Notice of Allowance dated Feb. 18, 2016 in U.S. Appl. No. 13/800,020.

* cited by examiner

METHODS, SYSTEMS, AND MEDIA FOR PROVIDING A REMOTE CONTROL INTERFACE

CROSS-REFERENCE TO RELATED APPLICATIONS

This application is a continuation of U.S. patent application Ser. No. 13/800,020, filed Mar. 13, 2013, which is hereby incorporated by reference herein in its entirety.

TECHNICAL FIELD

Methods, systems, and media for providing a remote control interface.

BACKGROUND

Programming a universal remote control may involve an overwhelming number of steps. For example, a user may be required to know a significant number of details about the device to be controlled, such as the specific device manufacturer and the specific model. In another example, the user may be required to point the original remote control at the universal remote control and press a button on the original remote control in order for the universal remote to receive and learn the infrared signal for that button. In yet another example, the user may be required to press the power button on the remote control until the device to be controlled is turned off while the remote control cycles through various output signals associated different devices. Even further, this programming process has to be repeated for each device to be controlled by the universal remote control. As the number of devices to be controlled continues to increase (e.g., a television, a set-top box, a DVD player, a digital video recording device, an audio receiver, a home theater system, etc.), programing a universal remote control is often a time-consuming experience.

Accordingly, it is desirable to provide methods, systems, and media for providing a remote control interface.

SUMMARY

In accordance with various implementations of the disclosed subject matter, mechanisms for providing a remote control interface are provided.

In accordance with some implementations of the disclosed subject matter, a method for providing a remote control interface is provided, the method comprising: receiving, using one or more hardware processors, an image of a user input interface associated with a media playback device; identifying the user input interface from a plurality of user input interfaces based on image recognition; determining a code library associated with the identified user input interface; and transmitting the code library to a mobile device that provided the image of the user input interface, wherein the code library allows a mobile device to control the media playback device.

In accordance with some implementations of the disclosed subject matter, a system for providing a remote control interface is provided. The system comprising a hardware processor, wherein the hardware processor is configured to: receive an image of a user input interface associated with a media playback device; identify the user input interface from a plurality of user input interfaces based on image recognition; determine a code library associated with the identified user input interface; and transmit the code library to a mobile device that provided the image of the user input interface, wherein the code library allows a mobile device to control the media playback device.

In accordance with some implementations of the disclosed subject matter, a non-transitory computer-readable medium containing computer-executable instructions that, when executed by a processor, cause the processor to perform a method for providing a remote control interface, is provided. The method comprises: receiving an image of a user input interface associated with a media playback device; identifying the user input interface from a plurality of user input interfaces based on image recognition; determining a code library associated with the identified user input interface; and transmitting the code library to a mobile device that provided the image of the user input interface, wherein the code library allows a mobile device to control the media playback device.

In accordance with some implementations of the disclosed subject matter, a system for providing a remote control interface is provided. The system comprising: means for receiving an image of a user input interface associated with a media playback device; means for identifying the user input interface from a plurality of user input interfaces based on image recognition; means for determining a code library associated with the identified user input interface; and means for transmitting the code library to a mobile device that provided the image of the user input interface, wherein the code library allows a mobile device to control the media playback device.

In some implementations, the user input interface is a remote control and wherein the media playback device is at least one of a television, a set-top box, a DVD player, a digital video recorder, a gaming device, and a home theater system.

In some implementations, the code library is an infrared code library.

In some implementations, the system further comprises means for selecting a user input interface layout to be displayed on the mobile device.

In some implementations, the system further comprises means for selecting between a first user input interface layout that is generated based on the image of the user input interface and a second user input interface layout that is generated based on a predetermined user input interface layout.

In some implementations, the system further comprises means for generating the first user input interface layout by modifying the received image of the user input interface and mapping the code library to portions of the modified image.

In some implementations, the system further comprises means for transmitting the user input interface layout to the mobile device that provided the image of the user input interface and transmitting the code library to an external media device for controlling the media playback device.

In some implementations, guidance data is provided with the user input interface layout.

In some implementations, the system further comprises means for using optical character recognition to identify text portions of the image of the user input interface.

In some implementations, the system further comprises: means for receiving a second image of a second user input interface associated with a second media playback device; means for identifying the user input interface from a plurality of user input interfaces based on image recognition; means for determining a second code library associated with the second user input interface; and means for transmitting the code library associated with the user input interface and the second code library associated with the second user input interface, wherein an interface on the mobile device uses the code library and the second code library to control the media playback device and the second media playback device.

BRIEF DESCRIPTION OF THE DRAWINGS

Various objects, features, and advantages of the present invention can be more fully appreciated with reference to the following detailed description of the invention when considered in connection with the following drawing, in which like reference numerals identify like elements.

DETAILED DESCRIPTION

Figure 1:
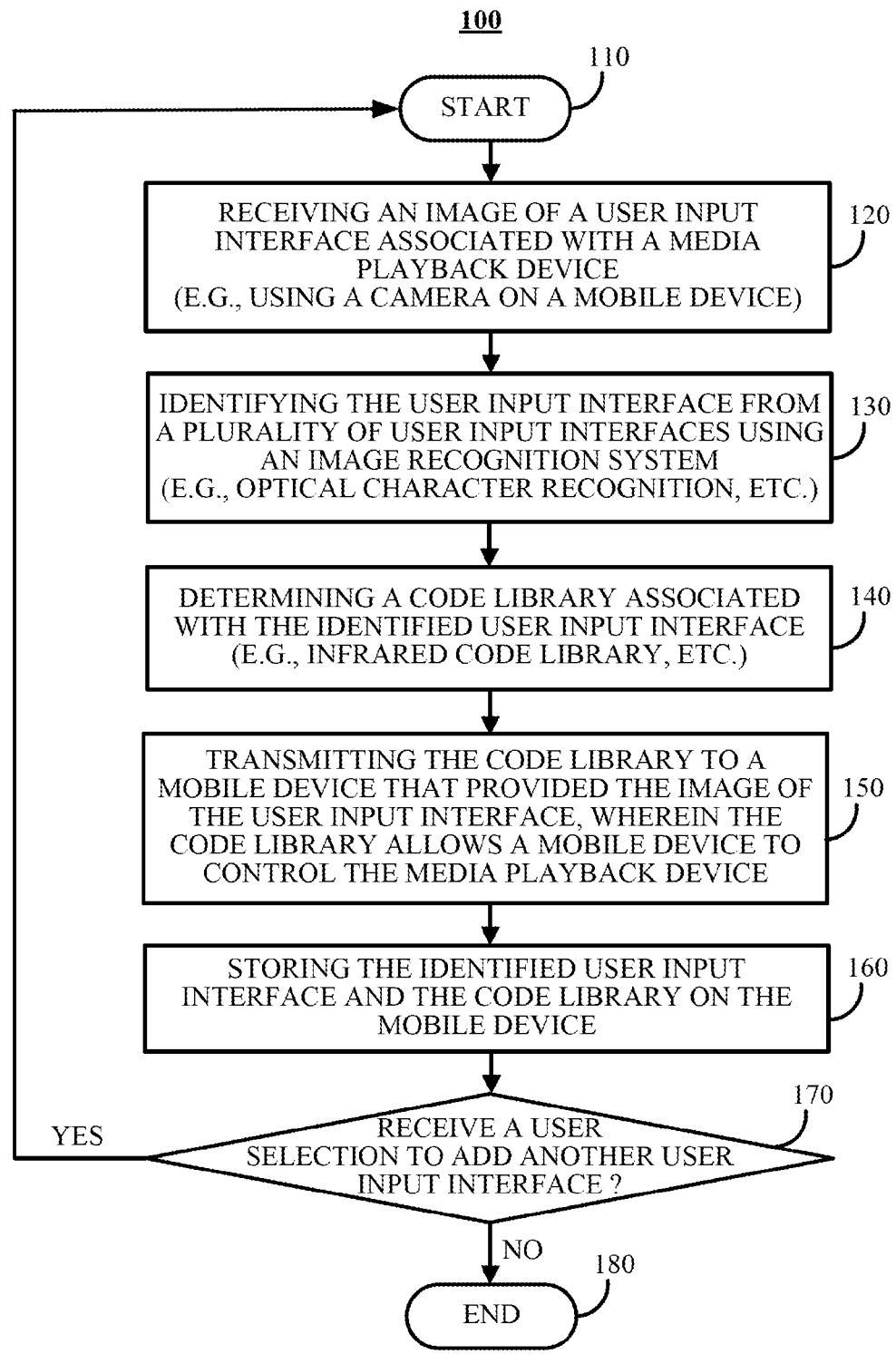
FIG. 1 is a flow chart of an illustrative process for generating a user input interface on a mobile device that controls a media playback device in response to receiving an image of the user input interface in accordance with some implementations of the disclosed subject matter.

In accordance with some implementations of the disclosed subject matter, mechanisms for providing a remote control interface are provided.

These mechanisms can include receiving an image of a user input interface (e.g., a remote control, a keyboard, a touchpad, a computer mouse, etc.), where the user input interface is associated with a media playback device (e.g., a television, a set top box, a DVD player, a digital video recorder, a gaming device, a home theater system, etc.). For example, a user can launch a user input interface application on a mobile device and the user input interface application can request that the user capture an image of a user input interface, such as a remote control (or a portion of the remote control). Using the mobile device (e.g., a mobile telephone having a camera, a tablet computing device having a camera, a mobile device having a front facing camera and/or a rear facing camera, etc.), the user can capture an image of the user input interface. In some implementations, the user input interface application can transmit the captured image to a suitable server for identification. For example, the server can compare the captured image to stored examples of various user input interfaces, or to examples of user input interfaces found on a network, such as the Internet.

In some implementations, in response to receiving the captured image of the user input interface at the server, the mechanisms can identify the user input interface from among various examples of user input interfaces using any suitable image recognition techniques. For example, in some implementations, the mechanisms can use optical character recognition techniques, other suitable image recognition techniques, and/or any suitable combination thereof. For example, the mechanisms can match the captured image of the user input interface (e.g., a remote control) with an image of an available user input interface.

In some implementations, the mechanisms can determine a code library corresponding to a media playback device associated with an identified user input interface. For example, the server can contain code libraries used by various user input interfaces to control a corresponding media playback device. In another example, the server can retrieve a code library upon identifying a user input interface. The mechanisms can then match the captured image of the user input interface with one of the code libraries based on the identified user input interface.

In response to determining a code library associated with the identified user input interface, the mechanisms can transmit the code library to the mobile device that provided the image of the user input interface, where the mechanisms can allow the mobile device to control the media playback device. For example, in response to receiving the code library of the identified user input interface, the mechanisms can allow the user to control the media playback device using the user input interface application on the mobile device. In a more particular example, the user input interface application executing on the mobile device can present the user with a user input interface that uses the code library to control a media playback device.

In some implementations, the user can select the captured image of the user input interface to be displayed on the mobile device as a graphical user interface for controlling one or more media playback devices. Additionally or alternatively, the user can select a predetermined user input interface (e.g., a generic remote control interface) to be displayed on the mobile device as a graphical user interface for controlling one or more media playback devices.

These mechanisms can be used in a variety of applications. For example, these mechanisms can be used to automatically program a remote control interface that is presented on a mobile device. In another example, these mechanisms can be used to program a mobile device with various code libraries for controlling different media playback devices. In yet another example, these mechanisms can be used to provide a universal remote control that organizes and stores graphical user interfaces that correspond to the user input interfaces associated with one or more users and/or one or more media playback devices on a mobile device.

Turning to FIG. 1, a flow chart of an illustrative process 100 for generating a user input interface on a mobile device that controls a media playback device in response to receiving an image of the user input interface is shown in accordance with some implementations. Such a graphical user interface can be provided to a user, for example, to control a media playback device.

Process 100 can begin by receiving an image of a user input interface, where the user input interface (e.g., a remote control, a keyboard, a touchpad, a computer mouse, a gaming controller, etc.) is associated with one or more media playback devices (e.g., television, set-top box, DVD player, home theater system, etc.) at 120. For example, a user can launch a user input interface application on a mobile device, where the user input interface application can request that the user capture an image of a user input interface. Using the mobile device (e.g., a mobile telephone having a camera, a tablet computing device having a camera, a mobile device having a front facing camera and/or a rear facing camera, etc.), the user can capture an image of the user input interface with any suitable imaging device built into or connected to the mobile device. Alternatively, the user input interface application can receive an image of the user input interface that is stored on the mobile device (e.g., an image stored on the mobile device). In another suitable example, the user input interface application can automatically launch an image capture application on the mobile device and request that the user capture an image of the user input interface using the camera of the mobile device. These images can be stored in any suitable storage device (e.g., a memory connected to the mobile device).

In some implementations, in response to launching the user input interface application, a setup interface can be presented on the mobile device. The setup interface can request that the user use the camera of the mobile device to capture an image of the user input interface. Alternatively, the setup interface can request that the user select a previously captured image of the user input interface. In some implementations, the setup interface of the user input interface application can provide the user with additional options, such as whether to present a program guide on the mobile device that is associated with content selections made using the generated user input interface, whether to setup multiple user input interfaces (e.g., via multiple captured images), etc. In such an example, a program guide or any other suitable content guidance data can be presented on the mobile device screen along with the generated user input interface. Alternatively, the user input interface application can provide the user with an opportunity to switch between presenting the program guide on the display screen of the mobile device and presenting the user input interface on the display screen of the mobile device.

Although the embodiments generally described herein relate to providing a remote control interface on a mobile device in response to capturing an image of the remote control, this is merely illustrative. For example, the user input interface can be a gaming controller that corresponds to a gaming console. The user input interface can be any suitable user input interface, such as a remote control, a keyboard, a touchpad, a mobile phone, a gaming controller, and/or any other suitable user input interface. It should also be noted that the media playback device can be any suitable media playback device, such as a television, a smart television, a set-top box, a DVD player, a digital video recorder, a home theater system, a speaker device, a gaming device, a personal computer, a digital media receiver, a multimedia terminal, and/or any other suitable media playback device.

In some implementations, the user input interface application can cause the captured image of the user input interface to be transmitted to a server or any other suitable system that is configured to identify the user input interface (e.g., a particular remote control from a database of remote controls). In response to receiving the captured images of the user input interface, the server can identify the user input interface based on various examples of user input interfaces by using any suitable image recognition techniques at 130. For example, as described above, the user input interface can be identified using a Canny Edge Detection approach, a Scale Invariant Feature Transform (SIFT) approach, or any other suitable image recognition algorithm. In some implementations, the server can identify the particular user input interface of the captured image of the user input interface with a user input interface available (or that has been available) in the marketplace. For example, the server can identify a remote control associated with a particular television based on the remote controls or other control devices available in the marketplace. As another example, the server can identify a remote control associated with a DVD player. As yet another example, the user input interface can be identified based on optical character recognition. In this example, the server executing the user input interface application can perform an optical character recognition on the captured image to determine the text layout of the keys on the user input interface and compare the text layout with text layouts associated with known user input interfaces. It should be noted that any suitable image recognition technique can be used.

In some implementations, in response to identifying a user input interface that is associated with more than one media playback device (e.g., remote controls with similar appearances that are associated with two or more different devices), the server can identify multiple media playback devices that may be associated with the user input interface. For example, the server can create a list of the media playback devices associated with the user input interface. Additionally, the user input interface application can prompt the user to select a media playback device from the list of media playback devices that is associated with the captured image of the user input interface. For example, the user input interface application can provide the user with images associated with the media playback devices to be controlled and request that the user select the image that matches the media playback device. Alternatively, the server can select a media playback device based on information received from the user in the setup interface (e.g., the media playback device having a high likelihood based on user inputs).

Similarly, in some implementations, the server can identify multiple user input interfaces that may be associated with the captured image. In response, the server can create a list of the multiple user input interfaces that match the captured image. For example, the user input interface application can provide the user with images associated with the multiple user input interfaces and request that the user select the image that matches the user input interface.

At 140, a code library (or code libraries) associated with the identified user input interface can be determined. For example, the server can transmit a query to a database of infrared code libraries. The query can include the user input interface identified from the capture image and/or other suitable information (e.g., product type, model number, etc.) and, in response to the query, the server can receive an infrared code library associated with the identified user input interface. In some implementations, the server can store one or more code libraries that correspond to various user input interfaces. It should be noted that each user input interface (e.g., remote control) can have a corresponding code library, which can include one or more codes used to control a media playback device. It should also be noted that some user input interfaces can share a code library, while some user input interfaces can be associated with a generic code library.

In a more particular implementation, the code library can include multiple infrared code sequences that can be used to control a media playback device. For example, each infrared code sequence within the code library can correspond to one button (e.g., a volume up button, a channel up button, a program guide button, a numeric button, etc.) of the user input interface. Additionally or alternatively, each code library can include infrared code sequences corresponding to each of the buttons of the user input interface.

At 150, the one or more code libraries determined at 140 can be transmitted to the mobile device that provided the image of the user input interface. In some implementations, the user input interface application can be used to issue commands configured to control the media playback device based on the code library. For example, as described herein, in response to generating a user input interface on the mobile device and receiving an indication that the user has requested to increase the volume of a media playback device (e.g., pressing the up button on the display screen of the mobile device), the user input interface application can instruct an infrared transmitter connected to the mobile device to transmit the corresponding infrared code to the media playback device.

In response to receiving the identified user input interface and the associated code library, the mobile device can store the captured image of the identified user input interface, the identified user input interface, and/or the code library associated with the identified user input interface on the mobile device at 160. In some implementations, the captured image of the identified user input interface, the identified user input interface, and/or the code library associated with the identified user input interface can be stored in any suitable storage device. In a more particular example, the captured image of the identified user input interface, the identified user input interface, and/or the code library associated with identified user input interface can be stored in a memory of the mobile device (e.g., a flash memory, internal device memory, etc.). As another example, the captured image of the identified user input interface, the identified user input interface, and/or the code library associated with identified user input interface can be stored in a digital media receiver in communications with the mobile device.

In some implementations, process 100 can be repeated for additional user input interfaces associated with other media playback devices. For example, in response to storing the captured image of the identified user input interface (e.g., a television remote control), the identified user input interface, and/or the code library associated with the user input interface, a user can select to repeat process 100 with another user input interface associated with another media playback device at 170 (e.g., a gaming controller). This can, for example, allow the user to program a universal remote control interface that is presented on the mobile device with multiple code libraries to control multiple media playback devices (e.g., a television, a set-top box, a digital media receiver, a gaming console, etc.). Additionally or alternatively, this can also allow the user to program multiple remote control interfaces that can be presented on the mobile device with the corresponding code library to control one or more media playback devices (e.g., a remote control interface for controlling the television and, upon receiving a user input to change remote controls, a remote control interface for controlling the gaming device).

In response to a user selecting to repeat process 100 with another user input interface, the process 100 for generating a user input interface on a mobile device that controls a media playback device can be directed back to 110 in accordance with some implementations of the disclosed subject matter. Alternatively, in response to the user not selecting to repeat process 100 with another user input interface, process 100 for generating a user input interface on a mobile device that controls a media playback device in response to receiving an image of the user input interface can end at 180.

Figure 2:
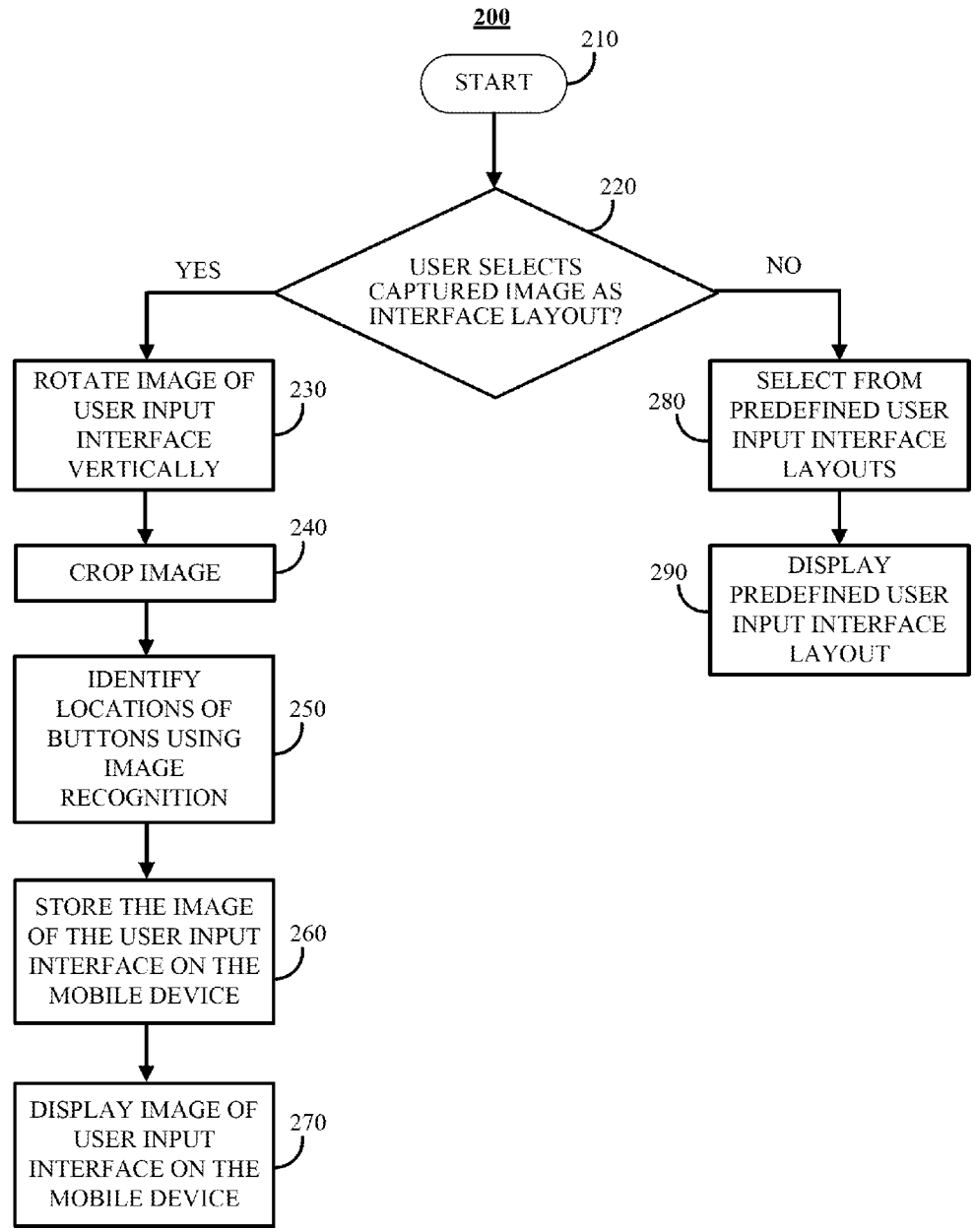
FIG. 2 is a is a flow chart of an illustrative process for selecting a user input interface layout that can be displayed on a mobile device in accordance with some implementations of the disclosed subject matter.

FIG. 2 is a flow chart of an illustrative process 200 for selecting a user input interface layout (e.g. a graphical user interface) that can be displayed on a mobile device in accordance with some implementations of the disclosed subject matter.

Figure 4:
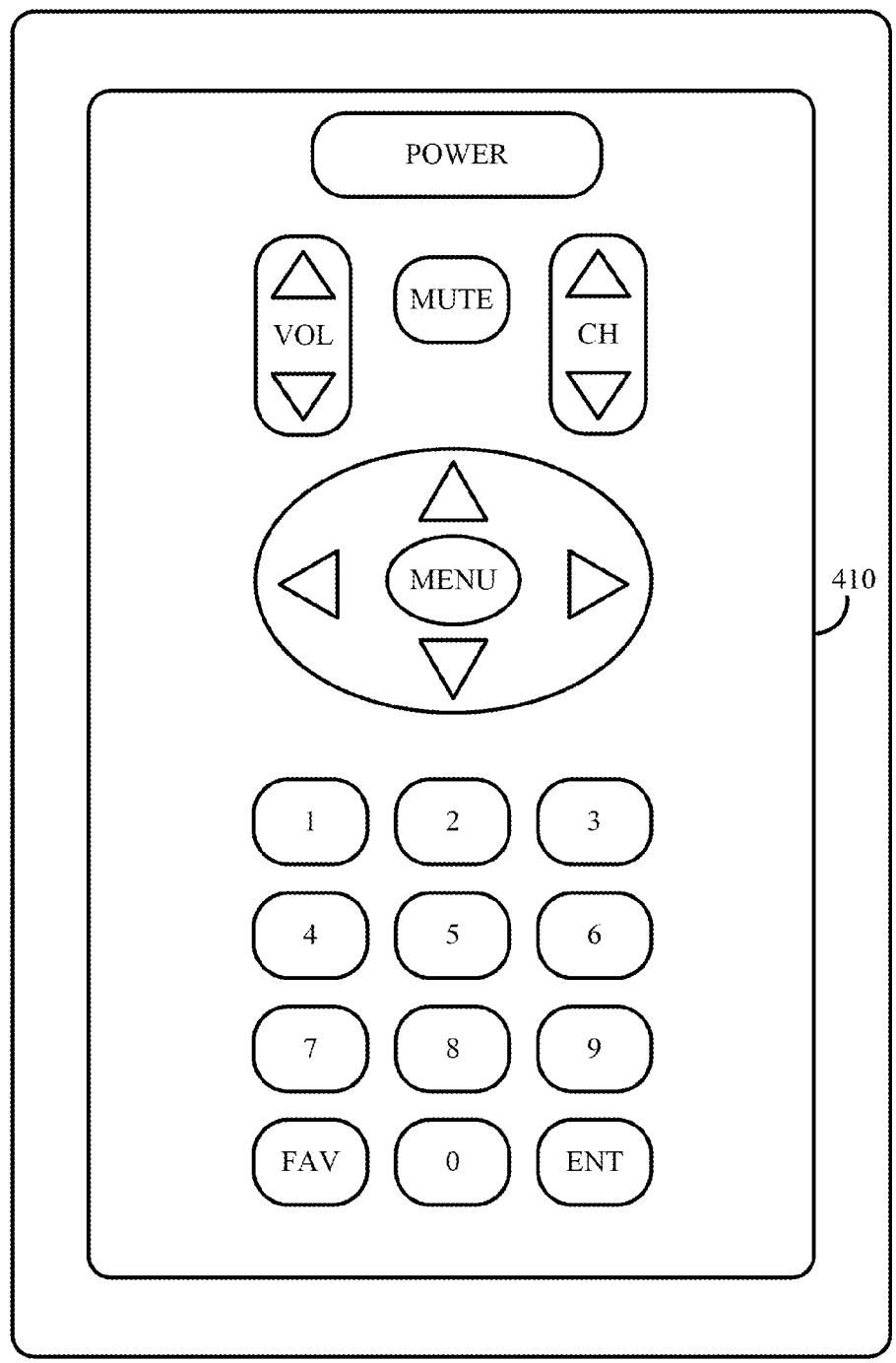
FIG. 4 is an example of a display screen presented on a mobile device that includes a generated user input interface having a predetermined user input interface layout in accordance with some implementations of the disclosed subject matter.

Process 200 can begin by receiving a user selection of a user input interface layout to be displayed on a mobile device at 220. For example, the user can select to use the captured image of a user input interface (e.g., a remote control, a keyboard, a touchpad, a computer mouse, etc.) for a media playback device (e.g., a television, a set top box, a DVD player, a digital video recorder, a home theater system, etc.) to be displayed on the mobile device (e.g., a mobile telephone having a camera, a tablet computing device having a camera, a mobile device having a front facing camera and/or a rear facing camera, etc.). As another example, the user can select a predefined user input interface layout. An illustrative example of such a predefined user input interface layout is shown in FIG. 4.

Figure 3:
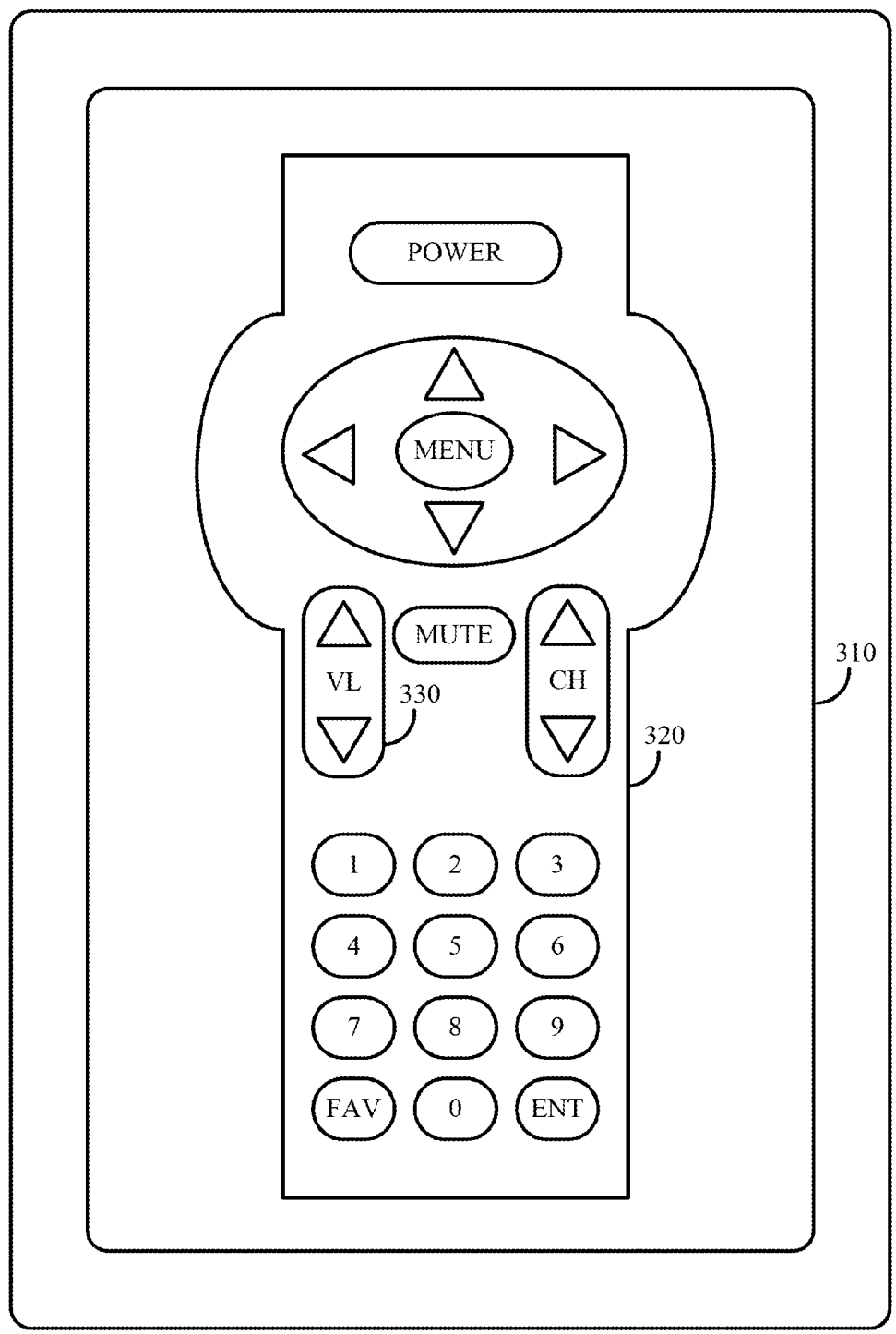
FIG. 3 is an example of a display screen presented on a mobile device that includes a generated user input interface for controlling a media playback device in accordance with some implementations of the disclosed subject matter.

In response to receiving a user selection to use the captured image of the user input interface as the interface layout to be displayed on the mobile device ("YES" at 220), the user input interface application can rotate the captured image of the user input interface to be vertical with respect to the mobile device at 230. In a more particular example, as shown in mobile device 300 of FIG. 3, the user input interface application can rotate the captured image of a user input interface 320 such that user input interface 320 is aligned with display 310. For example, the image of user input interface 320 can be aligned so that the top of the user input interface corresponds to a location of a transmitter for issuing commands from mobile device 300 to a media playback device.

At 240, the user input interface application can crop the captured image of the user input interface. For example, the user input interface application can remove any unnecessary negative space surrounding the image of the user input interface. In a more particular example, as shown in mobile device 300 of FIG. 3, the user input interface application can crop the area of the captured image surrounding the image of user input interface 320, leaving the image of user input interface 320 to be displayed on the display screen. It should be noted that any suitable image modification can be performed on the captured image (e.g., zooming in on a particular area of the captured image, sharpening at least a portion of the captured image, aligning the captured image, etc.).

At 250, the user input interface application can identify the location and/or text of buttons (e.g., volume buttons, channel buttons, etc.) in the image of the user input interface using any suitable image recognition techniques, such as optical character recognition techniques and/or any other suitable image recognition techniques. In a more particular example, as shown in mobile device 300 of FIG. 3, the user input interface application can use optical character recognition techniques to identify the text of the volume buttons 330 of the captured image of the user input interface (e.g., a "VOL+" button). Additionally or alternatively, the user input interface application can use image recognition techniques to determine the shapes of the buttons on the remote control (e.g., identify the up arrow and the down arrow of the volume buttons 330 of the captured image of the user input interface). Moreover, any suitable combination of optical character recognition and other image recognition techniques can be used to identify the text and/or shape of each button of the captured image of the user input interface. In some implementations, the user input interface application can determine a function for each button of the user input interface and can associate the function with the location of the button. For example, channel up/down, volume buttons, numbers, etc., can be matched to locations of the buttons in user input interface 320. If a function cannot be determined for a particular button, the user input interface application can disable the button (e.g., by shading the button in user input interface 320) or present a list of possible functions for selection by a user.

At 260, in response to identifying the location and/or the text of the buttons of the captured image of the user input interface, the user input interface application can store the captured image of the user input interface and the location and text of the buttons of the captured image of the user input interface on the mobile device. The identified location and text of the buttons of the captured image of the user interface can be stored in any suitable storage device.

At 270, the user input interface application can display the captured image of the user input interface on the display screen of the mobile device. In a more particular example, as shown in mobile device 300 of FIG. 3, the user input interface 320 can be displayed on display 310 to represent the original user input interface. In some implementations, in response to detecting that the user has selected a button or option on the displayed user input interface, the user input interface application can use the associated code library to determine which code sequence (e.g., a particular infrared code sequence) to transmit to the media playback device. In a more particular implementation, the instructions from the determined code library can be mapped to the buttons and other interface features on the user input interface layout (e.g., map a particular sequence of infrared codes to transmit in response to selecting a button on the displayed user input interface). Alternatively, as described herein, in response to detecting that the user has selected a button on the displayed user input interface, instructions can be transmitted to another device (e.g., a digital media receiver having an infrared transmitter), where that device uses the associated code library to transmits a particular code sequence to the appropriate media playback device.

In some implementations, the user input interface application can display additional information concurrently with the image of the user input interface on the mobile device. For example, the user input interface application can display a program guide or any other suitable guidance information along with the image of the user input interface on the mobile device. In a more particular example, in response to receiving a user input on the image of the user input interface (e.g., a user selection of the channel up button), the user input interface application can display channel information, program listings associated with the selected channel, content information relating to the program being provided by the selected channel, detailed content information (e.g., program title, actor information, original airdate, rating, etc.), etc. In another more particular example, the user input interface can display the program guide or any other suitable guidance information along with the image of the user input interface on the mobile device in response to receiving a particular user selection (e.g., pressing a "GUIDE" button on image 320).

In some implementations, the user input interface application can provide the user with options for displaying additional information. For example, the user input interface application can display a selectable option that, when selected, causes a program guide or any other suitable guidance information to be displayed on screen 310 of the mobile device. The program guide or any other suitable guidance information can be displayed along with the image of the user input interface on the mobile device. Alternatively, the program guide or any other suitable guidance information can occupy screen 310 of the mobile device. In such an example, the user input interface application can allow the user to alternate between displaying image 320 of the user input interface and displaying a program guide or guidance information (e.g., where the user can use a sliding gesture on screen 310 to switch between the user input interface and the program guide).

In some implementations, as described above, the user input interface application can allow the user to configure multiple user input interfaces by submitting multiple images. In some implementations, the options for displaying additional information can include options for switching between multiple user input interfaces. For example, in response to setting up a universal remote control that controls a television device and a set-top box, and a gaming controller that controls a gaming console, the user input interface application can provide multiple user input interfaces and allow the user to alternate between displaying the universal remote control and the gaming controller on the mobile device. In another example, in response to setting up a universal remote control that controls a television device in one location (e.g., media playback devices in a living room environment) and a universal remote control that controls a television device in a second location (e.g., media playback devices in a bedroom environment), the user input interface application can provide multiple user input interfaces (e.g., each corresponding to a media playback device at a particular location) and allow the user to alternate or toggle between the multiple universal remote controls.

Alternatively, in response to not receiving a user selection of a captured image as an interface layout ("NO" at 220), the user can select a predefined user input interface layout at 280. For example, the user input interface application can include one or more predefined user input interface layouts in any suitable storage device. More particularly, the user can select from the one or more predefined user input interface layouts, such as a universal remote control interface for controlling multiple media playback devices, remote control interfaces having different button layouts, remote control interfaces having different themes, etc. In another example, the captured image of the user input interface can include more buttons than the user desires (e.g., more buttons than the user typically uses). In yet another example, the user may be unable to capture an image of the user input interface. In such examples, the user can select a predefined user input interface layout having a particular number of buttons (e.g., volume buttons, channel buttons, power buttons, etc.). It should be noted that displaying fewer buttons on a screen of the mobile device can, for example, allow the buttons of the user input interface to be displayed at a larger size and/or allow other content to be displayed with the user input interface (e.g., a program guide, content information, options for switching between multiple user input interfaces, etc.).

In response to selecting a predefined user input interface layout at 280, the user input interface application can display the predefined user input interface layout on the mobile device at 290. In a more particular example, as shown in mobile device 400 of FIG. 4, a predefined user input interface layout 420 can be displayed on display 410. As described above, the user input interface application, the server, or any other suitable component can map the functions and/or codes to the buttons on the predefined user input interface layout (e.g., particular infrared codes to transmit in response to selecting an increase volume button on the particular layout).

Figure 5:
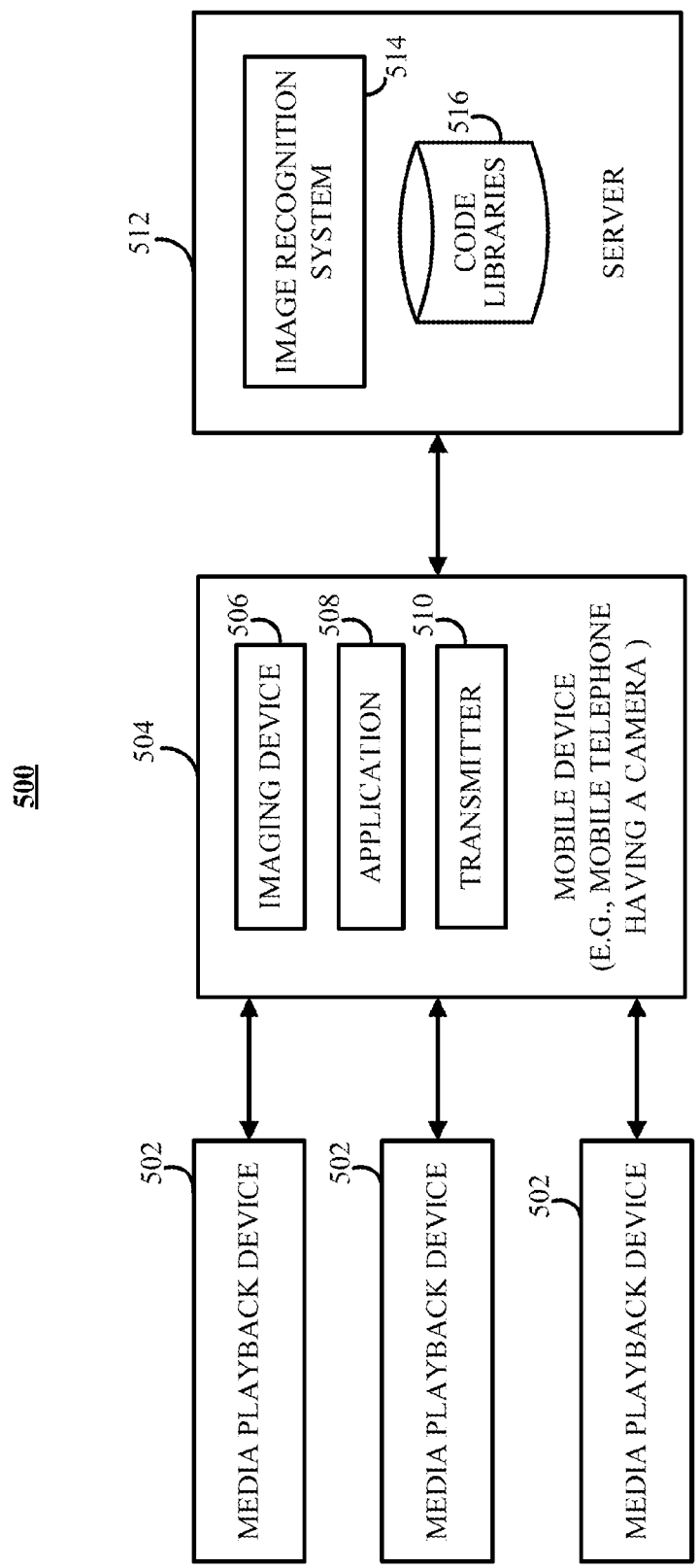
FIG. 5 is a generalized schematic diagram of an illustrative system for generating a user input interface on a mobile device that controls a media playback device in response to receiving an image of the user input interface in accordance with some implementations of the disclosed subject matter.

FIG. 5 shows a generalized schematic diagram of an illustrative system 500 on which process 100 for generating a user input interface on a mobile device that controls a media playback device in response to receiving an image of the user input interface in accordance with some implementations of the disclosed subject matter. As illustrated, system 500 can include media playback devices 502, a mobile device 504, and a server 512.

As shown in FIG. 5, system 500 can include one or more media playback devices 502. Media playback device 502 can include any device for presenting media content and/or obtaining and presenting media content items from various sources, etc. For example, a media playback device can be implemented as a television, a smart television, a set-top box, a DVD player, a digital video recorder, a home theater system, a speaker device, a gaming console, a personal computer, a multimedia terminal, etc.

In some implementations, media playback device 502 can include a storage device, such as a hard drive, a solid state storage device, a removable storage device, or any other suitable device for storing media content, media guidance information, etc.

Media playback devices 502 can be local to each other or remote from each other. For example, when one media playback device 502 is a television and another media playback device 502 is a set-top box, the media playback devices 502 can be located in the same room.

In some implementations, mobile device 504 can include, among other things, an imaging device 506, a user input interface application 508, and a transmitter 510. Imaging device 506 can be built-in to mobile device 504 or external to mobile device 504 (e.g., connected via a Bluetooth connection). For example, imaging device 506 can be a camera on a mobile device, such as a camera-enabled mobile device, a camera of a tablet computing device, or any other suitable imaging device. As another example, the imaging device can be a camera connected to mobile device 504 using any suitable connection (e.g., a wired connection, a wireless connection, etc.).

Transmitter 510 can be any suitable transmitter, such as an infrared transmitter and/or any other suitable transmitter. Additionally, transmitter 510 can be built-in to mobile device 504 or external to mobile device 504. For example, transmitter 510 can be an external infrared transmitter that can be connected to mobile device 504 using any suitable connection, such as using an audio jack of mobile device 504, a wired connection, a wireless connection, and/or any other suitable connection techniques.

In some implementations, imaging device 506 of mobile device 504 can capture an image of a user input interface (e.g., a remote control, a keyboard, a touchpad, a computer mouse, etc.), where the user input interface is associated with a particular media playback device 502 (e.g., a television, a set top box, a DVD player, a digital video recorder, a home theater system, etc.). Such captured images can be stored in any suitable storage device.

In some implementations, mobile device 504 can transmit the captured image of the user input interface to server 512 via a communication network using any suitable techniques.

Server 512 can include an image recognition system 514 and a code library database 516. Image recognition system 514 can include any suitable image recognition techniques, as described above in connection with FIG. 1.

In response to receiving the captured image of the user input interface, server 512 can identify a user input interface in the received captured image of the user input interface using image recognition system 512. In some implementations, server 512 can identify the particular user input interface in the captured image of the user input interface with a user input interface available in the marketplace. For example, server 512 can identify an image of a remote control in the captured image as a remote control associated with a particular television based on remote controls available in the marketplace. In another example, server 512 can identify multiple remote controls that match the captured image and can provide the user with images of the multiple remote controls for selection.

In some implementations, in response to identifying the user input interface contained in the received captured image, server 512 can determine a code library associated with the identified user input interface. In some implementations, the server can contain multiple code libraries corresponding to various user input interfaces available in the marketplace at code library database 516. In some implementations, code library database 516 can be internal or external to server 512. For example, code library database 516 can contain code libraries corresponding to popular user input interfaces available in the marketplace. In another example, code library database 516 can contain a code library that was retrieved from a suitable data source in response to identifying the user input interface in the captured image. In yet another example, code library database 516 can be updated—e.g., in response to identifying a new user input interface, in response to retrieving a new code library from an external data source, in response to receiving updated codes from a product manufacturer, etc.

It should be noted that the code libraries in code library database 516 can be any suitable code library that can be used to issue commands to control a media playback device 502 associated with the code library and/or any other suitable code library. For example, a code library in code library database 516 can include multiple infrared code sequences that can be used to control a media playback device 502. Each infrared code sequence within the code library can correspond to one button (e.g. volume button, channel button, etc.) of the user input interface. Additionally or alternatively, each code library can include infrared code sequences corresponding to each of the buttons of the user input interface.

In some implementations, in response to determining the code library associated with the identified user input interface, server 512 can transmit the identified user input interface and the associated code libraries of the user input interface to mobile device 504.

In some implementations, mobile device 504 can store the captured image of the user input interface, the identified user input interface, and/or the code library associated with the user input interface. In such an embodiment, the captured image of the user input interface, the identified user input interface, and/or the code library associated with the user input interface can be stored in any suitable storage device internal to mobile device 504 or external to mobile device 504.

Figure 6:
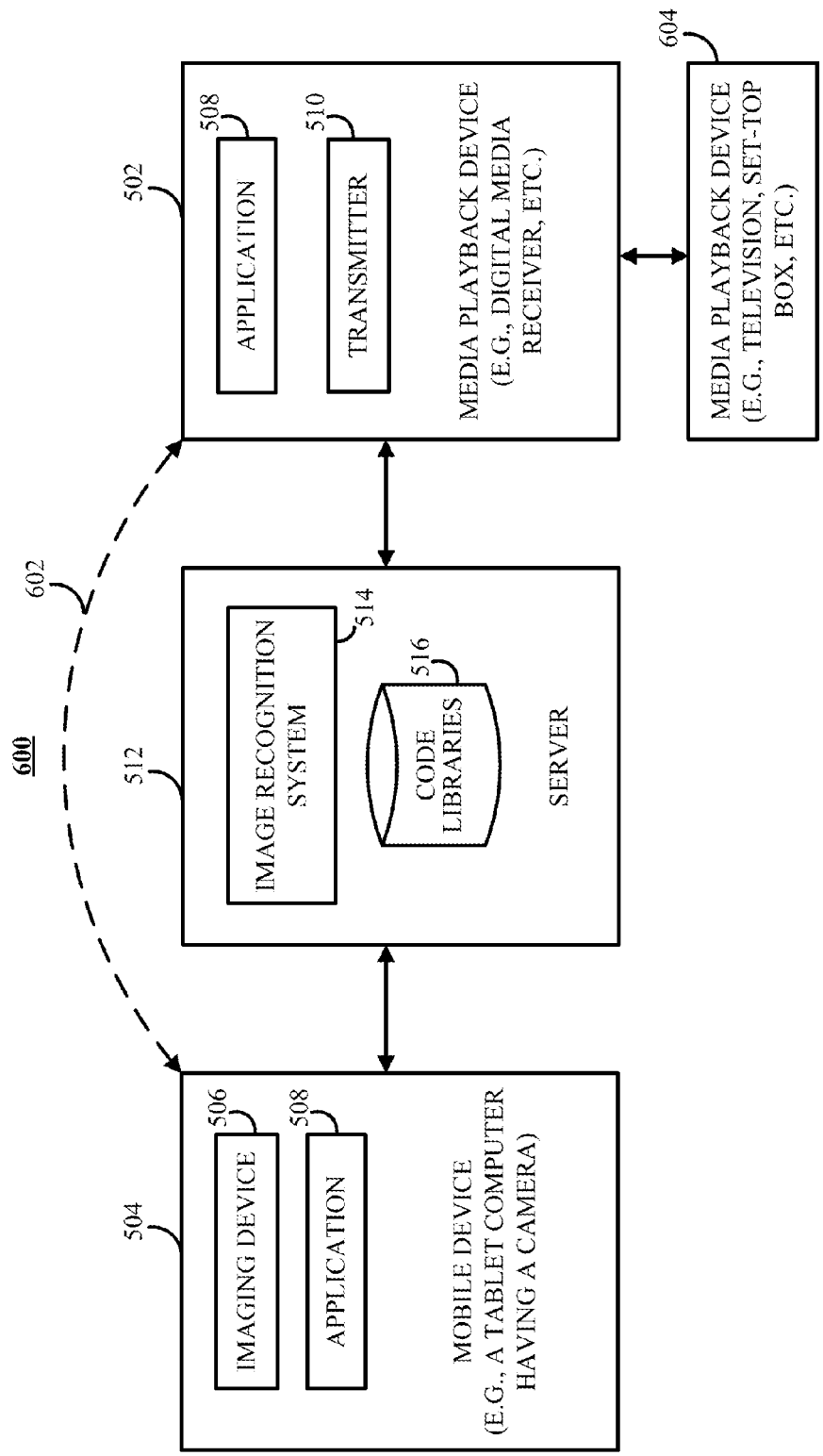
FIG. 6 is a generalized schematic diagram of an illustrative system for generating a user input interface on a mobile device that controls a media playback device in response to receiving an image of the user input interface in accordance with some implementations of the disclosed subject matter.

FIG. 6 is a generalized schematic diagram of another illustrative system for generating a user input interface on a mobile device that controls a media playback device in response to receiving an image of the user input interface in accordance with some implementations of the disclosed subject matter. As shown, system 600 can include a mobile device 504, a server 512, and a media playback device 502.

In some implementations, in response to determining the code library associated with the identified user input interface, the server 512 can transmit the associated code library of the user input interface to the media playback device 502 (e.g., a set-top box, a smart television, etc.). In a more particular implementation, the server 512 can determine that the mobile device 504 does not have infrared transmission capabilities that the media playback device 502 has infrared transmission capabilities. In response to such a determination, the server 512 can transmit the code library to the media playback device 502 and transmit the layout of the generated user input interface to mobile device 504. In response to presenting user input interface on mobile device 504 and in response to receiving a user input (e.g., selecting a button), mobile device 504 can transmit instructions to media playback device 502 (e.g., a digital media receiver) using a wireless link 602 (e.g., a Bluetooth connection, a Wi-Fi connection, an 802.11(a), (b), (g), or (n) connection, etc.).

Media playback device 502 can then transmit instructions to an external media playback device 604 (e.g., a television, a set-top box, etc.) using an infrared transmitter or any other suitable transmitter. For example, media playback device 502 can include a user input interface application 508 and a transmitter 510. It should be noted that transmitter 510 can be built-in to media playback device 502 or external to media playback device 502. Using transmitter 510, the instructions from mobile device 504 can be directed to media playback device 604 in order to control media playback device 604 (e.g., a television, a DVD player, a set-top box, etc.).

Figure 7:
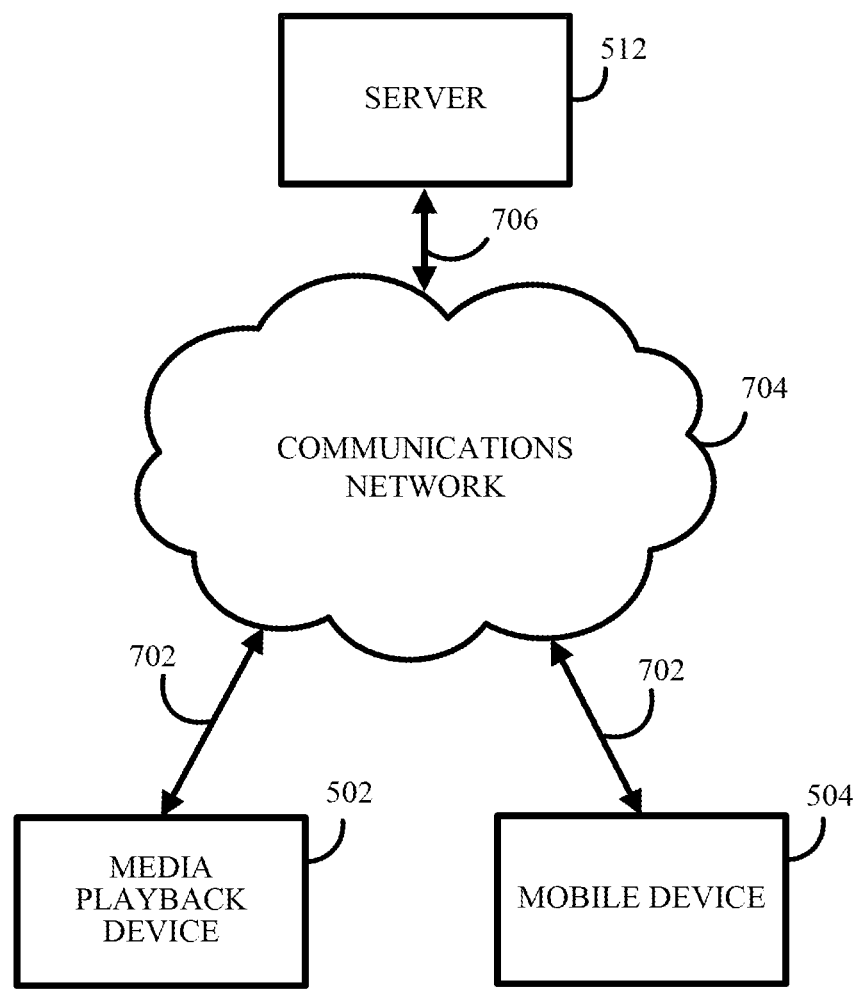
FIG. 7 is a generalized schematic diagram of an illustrative system suitable for implementation of the user input interface application in accordance with some implementations of the disclosed subject matter.

FIG. 7 shows a generalized schematic diagram of a system 700 on which the user input interface application can be implemented in accordance with some implementations of the disclosed subject matter. As shown, media playback device 502 and mobile device 504 can be connected by one or more communications links 702 to a communications network 704 that is linked via a communications link 706 to server 512.

In some implementations, communications network 704 can be any suitable computer network or combination of networks including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), etc. Communications links 702 and 706 can be any communications links suitable for communicating data among media playback device 502, mobile device 504, and server 512, such as network links, dial-up links, wireless links, hard-wired links, any other suitable communications links, or any suitable combination of such links. Mobile device 504 can enable a user to access features of the user input interface application. Media play back device 502, mobile device 504, and server 512 can be located at any suitable location. In one embodiment, media playback device 502, mobile device 504, and server 512 can be located within an organization. Alternatively, media playback device 502, mobile device 504, and server 512 can be distributed between multiple organizations.

System 700 can include one or more servers 512. Server 512 can be any suitable server for providing access to the user input interface application, such as a processor, a computer, a data processing device, or a combination of such devices. For example, the user input interface application can be distributed into multiple backend components and multiple frontend components or interfaces. In a more particular example, backend components, such as user input interface data distribution can be performed on one or more servers 512. Similarly, the graphical user interfaces displayed by the user input interface application, such as the graphical user interface for displaying a user input interface used to control a media playback device, can be distributed by one or more servers 512 to media playback device 502 or mobile device 504 via communication link 702.

Figure 8:
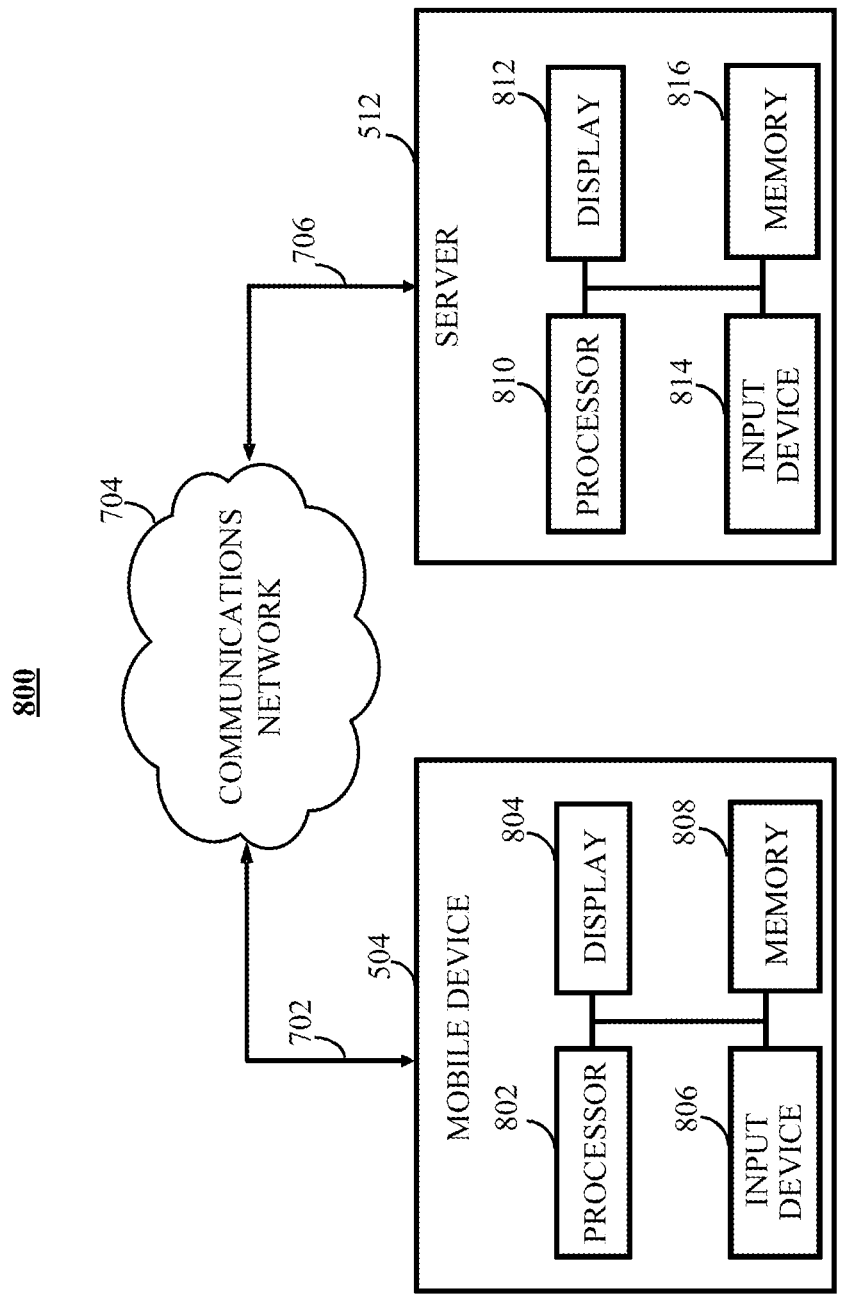
FIG. 8 is a generalized schematic diagram of an illustrative mobile device and server as provided, for example, in FIG. 7 in accordance with some implementations of the disclosed subject matter.

FIG. 8 shows and example 800 of hardware that can be used to implement server 512 and mobile device 504 depicted in FIG. 7 in accordance with some implementations. Referring to FIG. 8, a mobile device 502 can include a processor 802, a display 804, an input device 806, and memory 808, which can be interconnected. In some implementations, memory 808 can contain a storage device for storing a computer program for controlling processor 802.

Processor 802 can use the computer program to present on display 804 the user input interface application and the data received through communications link 702 and commands and values transmitted by a user of mobile device 504. It should be noted that data received through communications link 704 or any other communications links can be received from any suitable source. Input device 806 can include a computer keyboard, a mouse, a trackball, a keypad, a remote control, any other suitable input device, or any suitable combination thereof. Additionally or alternatively, input device 806 can include a touch screen display 804 that can receive input (e.g. using a finger, a stylus, or the like).

Server 512 can include a processor 810, a display 812, an input device 814, and a memory 816, which can be interconnected. In some embodiment, memory 816 can contain a storage device for storing data received through communications link 708 or through other links. In some implementations, memory 816 can further contain a storage device for storing a server program for controlling processor 810.

Processor 810 can use the computer program to present on display 812 a user input interface and/or the data received through communications link 706, and receive commands and values transmitted by mobile device 504 and/or media playback device 502. It should be noted that data received through communications link 704 or any other communications links can be received from any suitable source. Input device 814 can include a computer keyboard, a mouse, a trackball, a keypad, a remote control, any other suitable input device, or any suitable combination thereof. Additionally or alternatively, input device 814 can include a touch screen display 812 that can receive input (e.g., using a finger, a stylus, or the like). the user may make contact with the touch screen using any suitable object or appendage, such as a stylus, finger, etc. For example, an image of a user input interface can be displayed on the touch screen of the mobile device and the user input interface application can respond to contact with the touch screen, such as one or more taps on the touch screen, maintaining continuous contact with the touch screen, movement of the point of contact while maintaining continuous contact, a breaking of the contact, or any combination thereof.

In some implementations, the user input interface application can include an application program interface (not shown), and/or can be resident in memory 808 of mobile device 502 and/or memory 818 of server 512. Additionally or alternatively, a graphical user interface ("GUI") can be distributed to mobile device 502, which can allow a user to interact with the user input interface application resident at, for example, server 512.

It should be noted that in some implementations in addition to or in lieu of capturing an image of a user input interface, the user can capture an image of the media playback device (e.g., a DVD player, a television, etc.) using the camera of a smartphone or an image of a model number relating to the user input interface. In such implementations, the image of the media playback device or model number can be compared to similar images to identify a user input interface associated with the media playback device or model number, respectively.

In some implementations, the user input interface application can include client-side software, hardware, or both. For example, the user input interface application can encompass one or more Web-pages or Web-page portions (e.g., via any suitable encoding, such as HyperText Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches). As another example, the user input interface application can encompass a computer program that causes a processor to execute the user input interface application. In one particular embodiment, the one or more applications can include client-side software, server-side software, hardware, firmware, or any suitable combination thereof. For example, the application(s) can encompass a computer program written in a programming language recognizable by media playback device 502, mobile device 504, and/or server 512 that is executing the application(s) (e.g., a program written in a programming language, such as, Java, C, Objective-C, C++, C#, Javascript, Visual Basic, HTML, XML, ColdFusion, any other suitable approaches, or any suitable combination thereof).

Although the user input interface application is described herein as being implemented on a mobile device and/or server, this is only illustrative. The user input interface application can be implemented on any suitable platform (e.g., a personal computer ("PC"), a mainframe computer, a dumb terminal, a data display, a two-way pager, a wireless terminal, a portable telephone, a portable computer, a palmtop computer, an H/PC, an automobile PC, a laptop computer, a cellular phone, a personal digital assistant ("PDA"), a combined cellular phone and PDA, etc.) to provide such features.

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for providing a remote control interface are provided.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for providing remote control interfaces, the method comprising:
receiving, using a hardware processor, an image of a user input interface associated with a media playback device from an imaging device of a mobile device, wherein the user input interface is configured to transmit first wireless signals to the media playback device;
identifying, using the hardware processor, the user input interface from a plurality of user input interfaces based on the received image;
determining, using the hardware processor, a code library associated with the identified user input interface, wherein portions of the code library are mapped to input interfaces in a representation of the identified user input interface;
transmitting, using the hardware processor, the representation of the identified user input interface to be presented on the mobile device;
determining, using the hardware processor, whether to transmit the code library to the mobile device or an additional mobile device, wherein network connection information indicates that the mobile device is configured to transmit second wireless signals to the media playback device; and
in response to determining that the mobile device is connected to the media playback device via a wireless communications network and in response to determining that the mobile device is configured to transmit the second wireless signals to the media playback device over the wireless communications network that are different than the first wireless signals, transmitting, using the hardware processor, the code library to the media playback device for use with commands inputted into the representation of the identified user input interface and received as the second wireless signals.

2. The method of claim 1, wherein the code library is an infrared code library.

3. The method of claim 1, further comprising:
in response to receiving the image of the user input interface, identifying a plurality of user input interfaces based on the received image; and
causing a plurality of user input interface representations corresponding to the plurality of user input interfaces to be presented on the mobile device for selecting a user input interface representation from the plurality of user input interface representations.

4. The method of claim 3, wherein the plurality of user input interface representations includes a first user input interface representation that is generated based on the received image of the user input interface and a second user input interface representation that is generated based on a predetermined user input interface layout.

5. The method of claim 4, further comprising generating the first user input interface representation by modifying the received image of the user input interface and mapping the portions of the code library to portions of the modified image.

6. The method of claim 1, further comprising using optical character recognition to identify text portions of the received image of the user input interface, wherein the identified text portions of the received image are used to identify the user input interface.

7. A method for providing remote control interfaces, the method comprising:
   associating, using a mobile device that includes a hardware processor, with a media playback device over a wireless communications network;
   capturing, using an imaging device of the mobile device, an image of a user input interface associated with the media playback device, wherein the user input interface is configured to transmit first wireless signals to the media playback device;
   identifying, using the hardware processor of the mobile device, the user input interface from a plurality of user input interfaces based on the captured image;
   mapping, using the hardware processor of the mobile device, a code library associated with the identified user input interface to a plurality of interface elements in a representation of the user input interface in response to identifying the user input interface;
   causing, using the hardware processor of the mobile device, the representation of the user input interface to be presented on the mobile device;
   receiving, using the hardware processor of the mobile device, an input to one or more of the plurality of interface elements in the representation of the user input interface; and
   in response to associating with the media playback device over the wireless communications network, in response to determining that the mobile device is configured to transmit second wireless signals to the media playback device over the wireless communications network that are different than the first wireless signals, and in response to receiving the input to the one or more of the plurality of interface elements in the representation of the user input interface, transmitting, using the hardware processor of the mobile device, instructions to the media playback device over the wireless communications network in the second wireless signals, wherein the instructions include the input to the one or more of the plurality of interface elements and corresponding information from the code library.

8. The method of claim 7, further comprising transmitting the instructions to an external media device that is configured to transmit the first wireless signals, thereby causing the mobile device to control the media playback device via the external media device.

9. The method of claim 7, wherein the code library is an infrared code library.

10. The method of claim 7, further comprising:
   in response to capturing the image of the user input interface, receiving a plurality of user input interfaces that correspond to the captured image; and
   causing a plurality of user input interface representations corresponding to the plurality of user input interfaces to be presented for selecting a user input interface representation from the plurality of user input interface representations.

11. The method of claim 10, wherein the plurality of user input interface representations includes a first user input interface representation that is generated based on the captured image of the user input interface and a second user input interface representation that is generated based on a predetermined user input interface layout.

12. The method of claim 7, further comprising using optical character recognition to identify text portions of the captured image of the user input interface, wherein the identified text portions of the captured image are used to identify the user input interface.

13. A system for providing remote control interfaces, the system comprising:
   a hardware processor that is configured to:
      receive an image of a user input interface associated with a media playback device from an imaging device of a mobile device, wherein the user input interface is configured to transmit first wireless signals to the media playback device;
      identify the user input interface from a plurality of user input interfaces based on the received image;
      determine a code library associated with the identified user input interface, wherein portions of the code library are mapped to input interfaces in a representation of the identified user input interface;
      transmit the representation of the identified user input interface to be presented on the mobile device;
      determine whether to transmit the code library to the mobile device or an additional mobile device, wherein network connection information indicates that the mobile device is configured to transmit second wireless signals to the media playback device; and
      in response to determining that the mobile device is connected to the media playback device via a wireless communications network and in response to determining that the mobile device is configured to transmit the second wireless signals to the media playback device over the wireless communications network that are different than the first wireless signals, transmit the code library to the media playback device for use with commands inputted into the representation of the identified user input interface and received as the second wireless signals.

14. The system of claim 13, wherein the code library is an infrared code library.

15. The system of claim 13, wherein the hardware processor is further configured to:
   in response to receiving the image of the user input interface, identify a plurality of user input interfaces based on the received image; and
   cause a plurality of user input interface representations corresponding to the plurality of user input interfaces to be presented on the mobile device for selecting a user input interface representation from the plurality of user input interface representations.

16. The system of claim 15, wherein the plurality of user input interface representations includes a first user input interface representation that is generated based on the received image of the user input interface and a second user input interface representation that is generated based on a predetermined user input interface layout.

17. The system of claim 16, wherein the hardware processor is further configured to generate the first user input interface representation by modifying the received image of the user input interface and mapping the code library to portions of the modified image.

18. The system of claim 13, wherein the hardware processor is further configured to use optical character recognition to identify text portions of the received image of the user input interface, wherein the identified text portions of the received image are used to identify the user input interface.

\* \* \* \* \*